US012035266B2

(12) United States Patent
Ly-Gagnon et al.

(10) Patent No.: US 12,035,266 B2
(45) Date of Patent: Jul. 9, 2024

(54) SYNCHRONIZATION ESTIMATION BASED ON ULTRA-WIDEBAND CONNECTIONS (71) Applicant: Apple Inc., Cupertino, CA (US)

(72) Inventors: Yann Ly-Gagnon, San Francisco, CA (US); Arun Unkn, Cupertino, CA (US); Langford M. Wasada, Poway, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 17/384,558

(22) Filed: Jul. 23, 2021

(65) Prior Publication Data

US 2022/0295431 A1    Sep. 15, 2022

Related U.S. Application Data

(60) Provisional application No. 63/160,674, filed on Mar. 12, 2021.

(51) Int. Cl.
*H04W 56/00* (2009.01)

(52) U.S. Cl.
CPC ..... *H04W 56/005* (2013.01); *H04W 56/0015* (2013.01)

(58) Field of Classification Search
None
See application file for complete search history.

(56) References Cited

U.S. PATENT DOCUMENTS

| 9,848,069 | B2 | 12/2017 | Geboff et al. | |
| 10,771,294 | B1* | 9/2020 | Bhat Noojady Krishna | ............... H04L 65/70 |
| 11,250,696 | B1* | 2/2022 | Anvari | ............... G08G 1/091 |
| 2018/0083884 | A1* | 3/2018 | Kuang | ............... H04L 47/30 |
| 2023/0071506 | A1* | 3/2023 | Su | ............... H04L 69/22 |
| 2023/0072580 | A1* | 3/2023 | Van Hecke | ............... G06F 1/12 |

OTHER PUBLICATIONS

[No Author Listed], "Car Connectivity Consortium: Digital Key Release 3," Technical Specification, Version 0.2.6, Car Connectivity Consortium, 2021, 471 pages.

* cited by examiner

*Primary Examiner* — Jutai Kao
(74) *Attorney, Agent, or Firm* — Fish & Richardson P.C.

(57) ABSTRACT

An example system includes an application processor (AP), a transceiver associated with a firmware layer and a controller. The controller is configured to perform operations that include receiving data representing a clock synchronization request from a remote device, such as a UWB clock synchronization request. The request is received by the transceiver over a wireless communication link. The controller generates a response to the synchronization request. The response is configured for synchronizing a remote clock of the remote device and a local clock of the mobile device. The controller sends, to the remote device by the transceiver, the response to the synchronization request.

19 Claims, 6 Drawing Sheets

SYNCHRONIZATION ESTIMATION BASED ON ULTRA-WIDEBAND CONNECTIONS

CROSS-REFERENCE TO RELATED APPLICATION

This application claims priority to U.S. Provisional Patent Application No. 63/160,674, filed Mar. 12, 2021, the entire contents of which are incorporated herein by reference.

TECHNICAL FIELD

The disclosure relates to systems and techniques for managing communication links, including configuring a device to perform a low-energy continuous time synchronization with another device connected using an ultra-wideband (UWB) communication link.

BACKGROUND

Electronic devices can communicate with one another through one or more wireless communications links. As an example, a first electronic device can establish a wireless communications link, such as a Bluetooth link or a Wi-Fi link, with a second electronic device. The first electronic device can transmit data to and/or receive data from the second electronic device via the wireless communications link.

SUMMARY

This disclosure describes systems and processes for performing clock synchronization on devices communicating over personal area networks (PAN), such as using UWB communication links or Bluetooth Low Energy (BTLE) links (also called Bluetooth links). Generally, a remote device (e.g., a mobile device or vehicle) can be configured to communicate with a system (e.g., user equipment (UE) including a mobile device, etc.) over a UWB communication link. The systems and methods described in this document enable the UE to synchronize (e.g., continuously or semi-continuously) a clock of the UE with a remote clock of the remote device. The UE is configured to synchronize the UE clock with the remote clock without using an application processor (AP) of the UE. In some implementations, the UE, which may not have a dedicated clock for all UWB communications, uses a Bluetooth clock of the UE for UWB communications with the remote device, which is UWB-enabled.

The systems and processes described throughout this document provide one or more of the following advantages. A mobile device is configured to receive a synchronization request from a remote device and handle the request without accessing the AP of the mobile device. The mobile device is enabled to perform clock synchronization with UWB-based remote devices, Bluetooth Low Energy (BTLE)-based remote devices, and similar devices using only the firmware layer (e.g., a Logical Link Control and Adaptation Protocol L2CAP layer) of the mobile device. The mobile device is enabled to allow the AP to remain in a hibernation state.

The AP does not need to "wake up" to handle the synchronization request. This reduces battery consumption by the mobile device and thus extends the battery charge life. Additionally, the mobile device can repeatedly (e.g., continuously) synchronize clocks with the remote device for communication without accessing the AP for performing data processing. This further extends the battery charge life of the mobile device.

The mobile device is configured to respond to the synchronization request more quickly because the firmware layer is handling the request. The mobile device does not need to access the AP to process data. This reduces a time for processing the request because requests to not need to be sent from the L2CAP layer to the application layer for performing the synchronization. Thus, the mobile device reduces a delay is reduced between receiving the synchronization request from the remote device and sending a response to the remote device with synchronization data. The reduced delay enables higher synchronization accuracy between the mobile device and the remote device, relative to an accuracy that would be obtained with a longer delay between receiving the request and generating/sending a response to the remote device.

The mobile device is configured to operate more flexibly to handle different kinds of synchronization requests from remote devices that are configured differently from one another. For example, different remote devices may have different access to their respective clocks for synchronization purposes (e.g., according to the common control channel (CCC) protocol). The mobile device is configured to handle synchronization requests at various times (e.g., any time) or with different timing requirements because the mobile device can respond immediately with a synchronization response.

In an aspect, a method includes receiving, at a transceiver of a mobile device, a clock synchronization request from a remote device, the request being received over a wireless communication link; generating, by a controller associated with a firmware layer associated with the transceiver of the mobile device, a response to the synchronization request, the response being configured for synchronizing a remote clock of the remote device and a local clock of the mobile device; and sending, to the remote device by the transceiver, the response to the synchronization request.

Implementations of this aspect can include one or more of the following features.

In some implementations, the controller of the firmware layer is configured for generating the response without accessing an application processor (AP) of the mobile device.

In some implementations, the method includes maintaining an application processor (AP) of the mobile device in a hibernation state while generating the response, wherein the AP of the mobile device consumes a reduced power in the hibernation state relative to an increased power consumed during an active state in which the AP is enabled to process data.

In some implementations, the firmware layer comprises a Logical Link Control and Adaptation Protocol L2CAP layer.

In some implementations, generating the response to the synchronization request includes obtaining, from the request, a first clock value for the remote clock; accessing a second clock value for the local clock corresponding to receiving the request from the remote device; determining an adjustment for a first frequency of the remote clock, a second frequency value of the local clock, or both the first frequency and the second frequency; and generating data representing the determined adjustment, the response enabling the remote device to synchronize the remote clock with the local clock.

In some implementations, the response data comprises a converted Bluetooth (BT) clock value and a clock accuracy value, and wherein the synchronization request comprises a request for an ultra-wideband (UWB) clock value.

In some implementations, the method includes, prior to receiving the request, precomputing response data for including in the response to the synchronization request, the precomputed response data comprising L2CAP layer data.

In some implementations, the method includes generating BT credit data for controlling transmission to the remote device while an AP is in hibernation; sending the BT credit data to the firmware layer; and causing the AP to initiate hibernation.

In some implementations, the wireless communications link comprises a Bluetooth link. In some implementations, the Bluetooth link comprises a Bluetooth Low Energy Long Range (LE-LR) link or a Bluetooth Low Energy (LE) Coded Physical Layer (PHY) link.

In some implementations, the wireless communications link comprises an ultra-wideband (UWB) link.

In some implementations, the remote device comprises a vehicle.

In another aspect, a system includes an application processor (AP); a transceiver associated with a firmware layer and a controller; and memory storing instructions that when executed by controller, cause the controller perform operations comprising: receiving data representing a clock synchronization request from a remote device, the request being received by the transceiver over a wireless communication link; generating a response to the synchronization request, the response being configured for synchronizing a remote clock of the remote device and a local clock of the mobile device; and sending, to the remote device by the transceiver, the response to the synchronization request.

In some implementations, the controller is configured for generating the response without accessing the application processor (AP) of the mobile device.

In some implementations, the operations further include maintaining the application processor (AP) of the mobile device in a hibernation state while generating the response, wherein the AP of the mobile device consumes a reduced power in the hibernation state relative to an increased power consumed during an active state in which the AP is enabled to process data.

In some implementations, the firmware layer comprises a Logical Link Control and Adaptation Protocol L2CAP layer.

In some implementations, generating the response to the synchronization request comprises: obtaining, from the request, a first clock value for the remote clock; accessing a second clock value for the local clock corresponding to receiving the request from the remote device; determining an adjustment for a first frequency of the remote clock, a second frequency value of the local clock, or both the first frequency and the second frequency; and generating data representing the determined adjustment, the response enabling the remote device to synchronize the remote clock with the local clock.

In some implementations, the response data comprises a converted Bluetooth (BT) clock value and a clock accuracy value, and wherein the synchronization request comprises a request for an ultra-wideband (UWB) clock value.

In some implementations, the operations further include, prior to receiving the request, precomputing response data for including in the response to the synchronization request, the precomputed response data comprising L2CAP layer data.

In some implementations, operations further include generating BT credit data for controlling transmission to the remote device while an AP is in hibernation; sending the BT credit data to the firmware layer; and causing the AP to initiate hibernation.

In some implementations, the wireless communications link comprises a Bluetooth link. In some implementations, the Bluetooth link comprises a Bluetooth Low Energy Long Range (LE-LR) link or a Bluetooth Low Energy (LE) Coded Physical Layer (PHY) link. In some implementations, the wireless communications link comprises an ultra-wideband (UWB) link. In some implementations, the remote device comprises a vehicle.

In another aspect, a method can be substantially as shown and described herein.

In another aspect, a system can be substantially as shown and described herein.

In another aspect, a mobile device can be substantially as shown and described herein.

Other implementations are directed to systems, devices and non-transitory, computer-readable mediums including computer-executable instructions for performing the techniques described herein.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
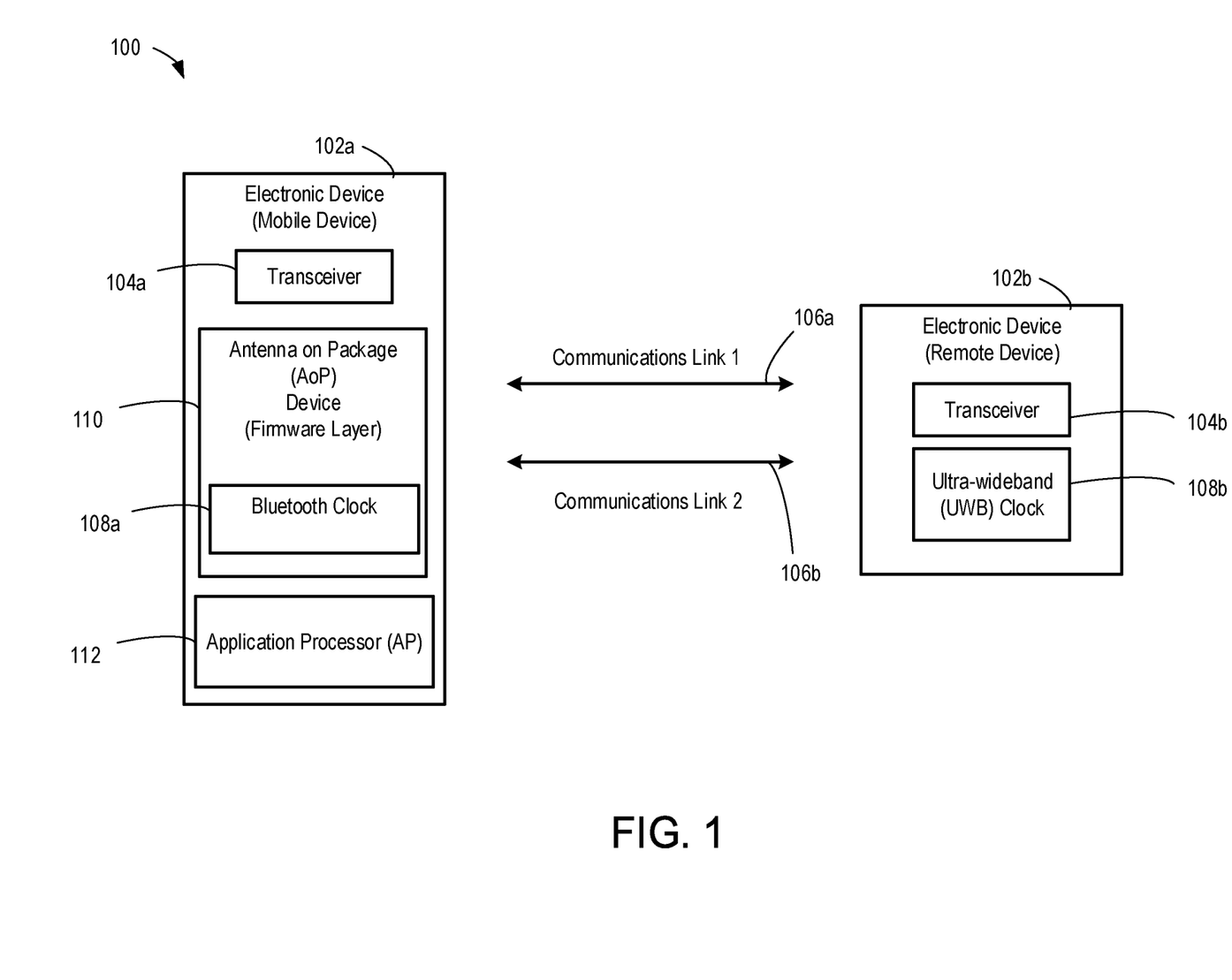
FIG. 1 shows a block diagram of an environment for synchronization estimation between wireless communications devices in ultra-wideband (UWB) scenarios.

FIG. 1 shows an example system 100 for synchronization estimation between wireless communications devices in ultra-wideband (UWB) scenarios. The system 100 includes a first electronic device 102*a* having a first wireless transceiver 104*a*, and a second electronic device 102*b* having a second wireless transceiver 104*b*.

In at least some implementations, the system 100 enables the electronic devices 102*a* and 102*b* to perform continuous synchronization estimation over UWB communications links, such as links 106*a* and 106*b*. The first electronic device 102*a* is configured to obtain synchronization data of the UWB clock of the second electronic device 102*b*. The first electronic device 102*a*, which may include a mobile device (e.g., a smartphone, smartwatch, etc.) is configured to receive a time synchronization request from the second electronic device 102b, which can include a vehicle (e.g., a keyless entry system for a vehicle). The time synchronization request is sent from the second electronic device 102b to the first electronic device 102a because a UWB clock 108b of the second electronic device 102b (the UWB-enabled device) generally drifts relative to a Bluetooth clock 108a of the first electronic device. The drift results in a clock skew (e.g., a variation in a frequency of the clock) between the clock 108 and the clock 108b. Generally, the second electronic device 106b is configured to send requests for time synchronization repeatedly (e.g., as fast as possible). In an example, when the second electronic device 102b is a vehicle, there is no power concern for clock synchronization for the second electronic device, and thus the second electronic device attempts to maintain continuous synchronization with the first electronic device 102a. This can cause the first electronic device 102a to activate an application processor (AP) 112 to respond to the request, rapidly draining power from the first electronic device 102a.

A Bluetooth firmware (FW) 110 of the first electronic device 102a is configured to process the remote (vehicle) request for time synchronization and cause the first electronic device 102a to send back a response without waking up an application processor of the first electronic device 102a. The Bluetooth clock is used for the first electronic device 102a in situations in which the first electronic device has no dedicated clock for UWB communication and the Bluetooth clock is the only common clock between the first and second devices 102a-b. Because the request is processed using the BT FW 110 (which may be part of an antenna-on-package (AOP) device), the first electronic device 102a is capable of synchronizing with the second electronic device 102b without causing a startup routine to activate (e.g., wake up) the application processor (AP) 112 of the first electronic device 102a. Activating the AP 112 of the first electronic device 102a consumes a relatively large amount of power relative to operation of the AP 112 in a hibernating mode (e.g., a sleep mode) and using the AoP device 110 to handle synchronization with the second electronic device 102b. By processing the request using the BT FW 110, the electronic device 102a avoids consuming power for waking the AP 112. Because the electronic device 102a can generally be a battery-powered mobile device, avoiding power consumption can result in longer battery life for using the electronic device 102a. This process is described in further detail with respect to FIG. 3.

The first electronic device 102a is configured to accommodate a request for re-synchronization (or continuously repeated requests) from the second electronic device 102b (also called the remote device). The second electronic device 102b thus can initiate a re-synchronization at any time. The first electronic device 102a is configured to respond to each of these requests without waking the AP 112 to save on power consumption in the first electronic device. The first electronic device 102a is configured to store a value for the BT clock 108a associated with the time of the request receipt. The first electronic device 102a is configured to store the value of the UWB clock 108b associated with the request (e.g., transmitted by the second electronic device 102b in the request). The first electronic device 102a is configured to perform a clock skew and drift compensation process (e.g., as described in U.S. Pat. No. 9,848,069, issued Dec. 19, 2017, incorporated herein by reference in entirety) using the BT FW 110. The first electronic device 102a replies directly through the Logical Link Control and Adaptation Protocol L2CAP layer without waking up the application processor 112 with the response message (e.g., the synchronization message).

As described above, the electronic devices 102a and 102b can communicate with one another via one or more wireless communications links. For example, using their wireless transceivers 104a and 140b, the electronic devices 102a can establish a first wireless communications link 106a and a second communications link 106b between them. Further, the electronic devices 102a and 102b can transmit data to and/or receive data from another via the wireless communications links 106a and 106b (e.g., by encoding the data in one or more signals and transmitting the signals wirelessly according to one or more wireless communications protocols).

In some implementations, the system 100 can be used to control a vehicle wirelessly. For example, the first electronic device 102a can be a mobile computing device or a wearable computing device that is carried or worn by a user. Further, the second electronic device 102b can be a component or sub-system of a vehicle, such as an electronic control system. The first electronic device 102a can store information that enables the user to gain access and operate the vehicle (e.g., one or more security tokens, certificates, or other credentials that indicate that the user of the first electronic device 102a is authorized to access and operate the vehicles). The first electronic device 102a can establish one or more wireless communications links with the second electronic device 102b, and transmit the stored information to the second electronic device 102b over the one or more wireless communication links. The second electronic device 102b can process the received information to determine whether the user is permitted to access and operate the vehicle, and if so, permit the user to do so. For instance, the second electronic device 102b can unlock one or more doors of vehicle such that the user can enter the vehicle, and enable an ignition system or starter system of the vehicle, such the user to start the vehicle's engine or motor. In some implementations, the system 100 can be used to emulate the functionality of a remote keyless system for a vehicle (e.g., a "keyless entry system" or "remote keyless ignition system") using a device such as a smartphone or smart watch.

Nevertheless, in practice, the electronic devices 102a and 102b can be any devices that are configured to receive, process, and transmit data. As an example, at least one of the electronic devices 102a or 102b can be a computing device, such as a client computing device (e.g., a desktop computer or a notebook computer), a server computing device (e.g., a server computer or cloud computing system), a mobile computing device (e.g., a cellular phone, smartphone, a tablet, a personal data assistant, or a notebook computer), a wearable computing device (e.g., a smart watch, a virtual reality headset, or an augmented reality headset), or other computing device capable of receiving, processing, and transmitting data. As another example, at least one of the electronic devices 102a or 102b can be a vehicle having wireless communications capabilities (e.g., a car, a truck, a motorcycle, a plane, a bicycle, a scooter, a boat, or any other vehicle that can transmit and receive data wirelessly using one or more wireless transmitters). As another example, at least one of the electronic devices 102a or 102b can be an accessory device having wireless communications capabilities (e.g., a headphone, an audio headset, an audio speaker, a camera, or a microphone, or any other accessory device that can transmit and receive data wirelessly using one or more wireless transmitters). In some implementations, at least one of the electronic devices 102a or 102b can operate using one or more operating systems (e.g., Apple macOS, Apple iOS, Microsoft Windows, Linux, Unix, Google Android, etc.) and one or more architectures (e.g., x86, PowerPC, ARM, etc.).

The wireless transceivers 104a and 104b can be configured to establish wireless communications links 106a-b, and transmit and receive data via those wireless communications links according to any wireless communications protocol. In some implementations, the wireless transceivers 104a and 104b can be implemented using the wireless communications subsystems 724 described with reference to FIG. 7. Example wireless communications protocols include the Wi-Fi family of wireless network protocols (e.g., as defined by Institute of Electrical and Electronics Engineers (IEEE) 802.11 technical standards) and the Bluetooth family of wireless network protocols (e.g., as defined by technical standards developed by the Bluetooth Special Interest Group). In some implementations, at least one of the wireless communications links 106a or 106b can be a Bluetooth link (e.g., a wireless communications link established in accordance with the Bluetooth family wireless network protocols and/or technical standards, such as Bluetooth 5). In some implementations, at least one of the wireless communications links 106a or 106b can be a Wi-Fi link (e.g., a wireless communications link established in accordance with the Wi-Fi family wireless network protocols and/or technical standards, such as IEEE 802.11ac or 802.11ax). Although FIG. 1 shows each of the electronic devices 102a and 102b having a single respective wireless transceiver 104a or 104b, in practice, each of the electronic devices 102a and 102b can have any number of transceivers.

In some implementations, multiple wireless communications links can be maintained concurrently between the electronic devices 102a and 102b (e.g., two or more). Further, at least some of the wireless communications links can have different capabilities or configurations than the others, such that data can be exchanged differently across the wireless communications links. For example, the first wireless communications link 106a can be configured such that it permits data to be transmitted in a more power efficient manner between the two electronic devices 102a and 102b, according to a greater effective communications range, and/or in a more resilient manner (e.g., compared to the second wireless communications link 106b). Further, the second wireless communications link 106b can be configured such that it permits data to be transmitted more quickly between the two electronic devices 102a and 102b (e.g., compared to the first wireless communications link 106a).

In some implementations, the first wireless communications link 106a can be a Bluetooth Low Energy Long Range (LE-LR) link and/or a Bluetooth Low Energy Coded Physical Layer (PHY) link (e.g., configured such that each data bit that is redundantly represented by 2 symbols, 8 symbols, or some other multiple of symbols during transmission), as defined in the Bluetooth 5 technical standards developed by the Bluetooth Special Interest Group. Further, the second wireless communications link 106b can be a Bluetooth Low Energy 1 Megabit (LE-1M) or Bluetooth Low Energy 2 Megabit (LE-2M) link (e.g., configured such that each data bit that is represented by a single symbol during transmission), as defined in the Bluetooth 5 technical standards developed by the Bluetooth Special Interest Group.

Figure 2:
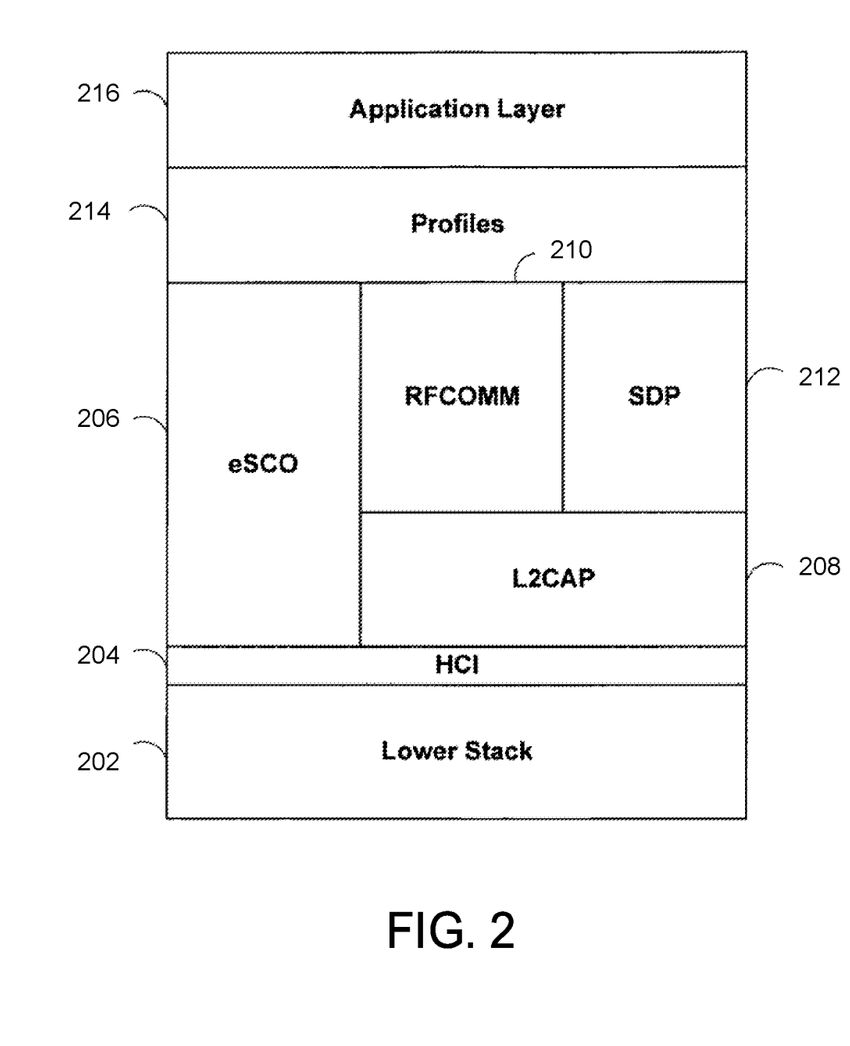
FIG. 2 is a schematic diagram of an exemplary hardware implementation of a Bluetooth device.

FIG. 2 is a simplified schematic diagram of an exemplary Bluetooth Protocol Stack 200. The most low-level software is included in lower stack 202. This section includes code to generate/receive radio signals, correct transmission errors and encrypt/decrypt transmissions, among other things. The Host Controller Interface (HCl) 204 is a standardized interface between the low-level Bluetooth functions and applications. Often, the HCl layer will represent a division between the lower stack 202 functions handled by a dedicated Bluetooth processor and the rest of the functions handled by an application-specific processor.

The Extended Synchronous Connection-Oriented (eSCO) 206 layer is used to implement dedicated communication channels, commonly used for voice data, in between the Lower Stack 202 and high-level applications. The Logical Link Control and Adaptation Protocol (L2CAP) 208 layer combines and repackages the data transmitted and received by the multiple higher-level applications. The L2CAP 208 layer combines all of these different communications into one data stream that can interface with Lower Stack 202. The RFCOMM 210 layer emulates the protocol used by serial connections. This allows software designers to easily integrate Bluetooth into existing applications which previously used a serial connection. The Service Discovery Protocol (SDP) 212 layer is used by devices to provide information about what services (or functions) each device offers and how other devices can access those services through Bluetooth.

The profiles 214 layer allows a device to identify itself as a member of a generic group of devices with a predefined set of functions. For example, a device complying with the headset profile will support predefined methods relating to audio communications. The application layer 216 contains programs that implement the useful tools created by all of the other layers. By writing different programs for application layer 216, software developers can focus on new uses of the Bluetooth functionality without having to rewrite the code which controls the underlying communication tasks.

Figure 3:
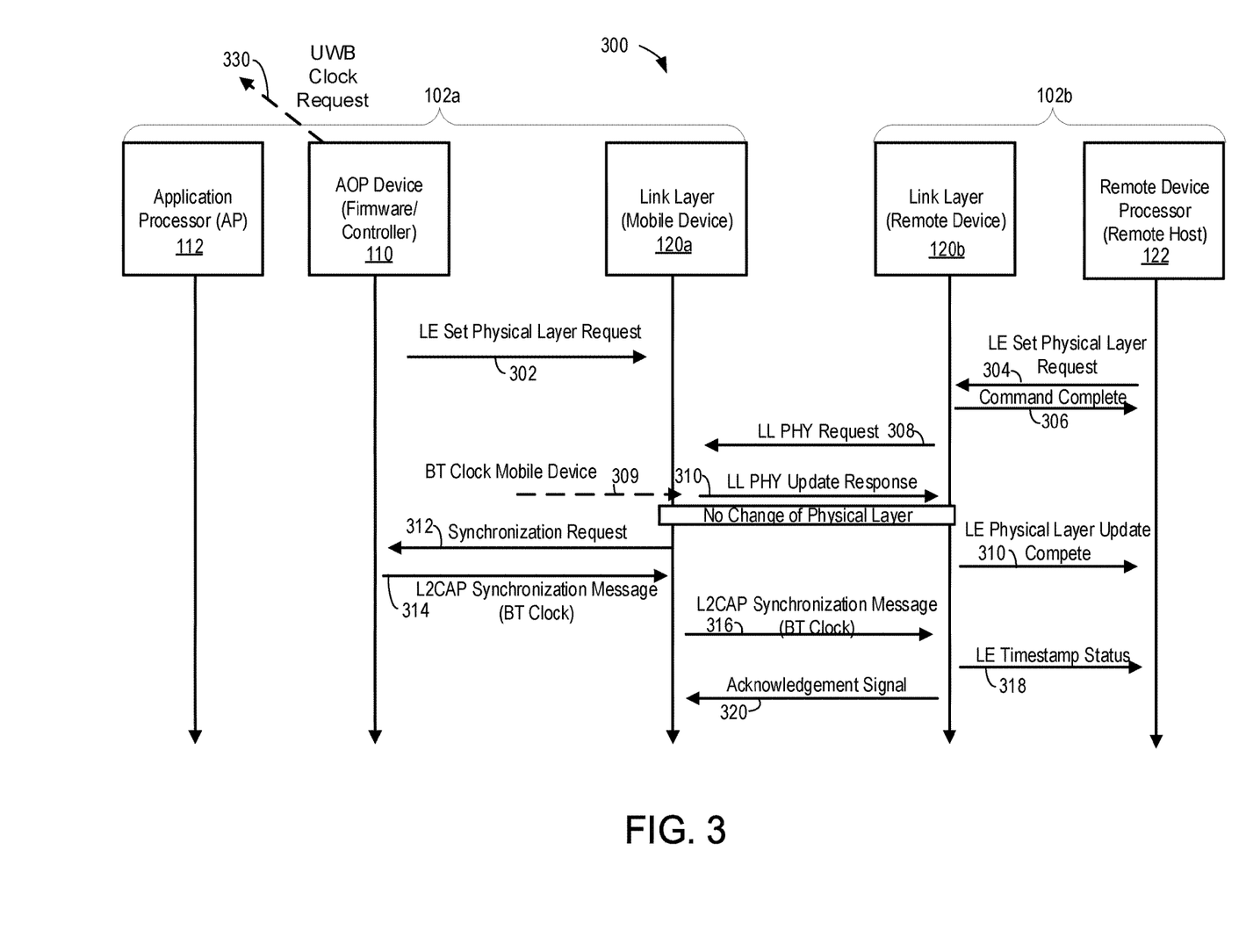
FIGS. 3-4 show a block diagrams of environments for synchronization estimation between wireless communications devices in ultra-wideband (UWB) scenarios.

FIG. 3 shows an environment 300 for synchronization estimation between wireless communications devices in ultra-wideband (UWB) scenarios. FIG. 3 shows the process for performing continuous synchronization without contacting the AP 112. The firmware 110 sends a LE set PHY layer request signal 302 to the link layer module (LL module) 120a of the mobile device 102. The LL module 120a is thus preconfigured with BT clock data for handling synchronization requests from the remote device 102b. The remote device 102b (e.g., a vehicle) sends a LE set PHY layer request 304 to the LL module 120b of the remote device, which is forwards the request signal 308 to the LL module 120a of the mobile device 102a. The LL_PHY_REQ signal 304 triggers the synchronization process. As shown in FIG. 3, the LL module 120a is configured to communicate directly with the firmware 110 to form the synchronization response L2CAP packet. The firmware response L2CAP signal 302 is received in advance of the request with a custom vendor specific command (VSC) from AP 112 (when awake) to the firmware 110. The L2CAP command is pre-computed and only the pertinent information is calculated online. An example message for precomputing the message is shown in Table 1, and a response is shown in Table 2.

TABLE 1

Message sent from the BT FW to AOP definition.

| Name | Bit numbers | Parameter description | Size (octets) |
|---|---|---|---|
| BTCLK_Phone0 | 27:0 | Bits 27:0: Representing the BTCLK_Phone0 | 4 |
| | 31:28 | Reserved | |

TABLE 1-continued

Message sent from the BT FW to AOP definition.

| Name | Bit numbers | Parameter description | Size (octets) |
|---|---|---|---|
| BTAddress | 48:0 | Public BTAddress of the device sending the LL_PHY_REQ. | 6 |
| Timesync EventType | 0 | Type of timesync event. 0: After ConnectionComplete 1: After LE_Set_Phy | 1 |
|  | 7:1 | Reserved | |

TABLE 2

Example Response from Firmware to BT Module.

| Name | Bit numbers | Parameter description | Size (octets) |
|---|---|---|---|
| BTCLK_Phone0_converted | | BTCLK_Phone0_converted | 8 |
| Accuracy | 7:0 | Log 2 accuracy of timestamp | 1 |
| BTAddress | 48:0 | Public BTAddress of the device sending the LL_PHY_REQ. | 6 |

The mobile device 102a can be toggled among several modes depending on whether it is desirable to wake the VSE used to determine whether the processor is active.

The parameter BT_Clock_local comprises a timestamp in BT clock increments representing a time at which a connection complete event is generated. The parameter BT_Clock_remote is a timestamp in BT clock increments representing a time when a connection complete event is generated. If the message including this parameter is coming from a slave, the parameter outputs a remote BT clock. If the message occurs on a slave device for synchronization, the BT_Clock_local is the local clock and BT_Clock_remote is the piconet clock. If this message is generated from a master device for synchronization, BT_Clock_remote is the same as BT_Clock_local. The BT clock is 28 bits (e.g., as defined per Bluetooth specification).

The message and response of tables 1 and 2 are sent prior to hibernation of the AP 112. In some implementations, the preconfigured message performs credit handling for the BTLE link. For example, the sent message from the AP 112 indicates how many credits are left before going to sleep. Credit control flow comprises determining a number of packets a device can receive. Here, the AP 112 updates the credit count each time the AP 112 is awake, and thus does not need to provide this data in the interim. For example, in LE Credit Based Flow Control Mode the SDU can be split into LE-frames. The credit count determines the number of LE-frames a device can receive. Each LE-frame can have a payload of 27 octets. When the SDU is bigger than this it is fragmented into LE-frames and sent to the peer device. Before the LE-frame is sent, the SDU determines whether the peer device can receive the message. The flow of LE-frames needs to be controlled. Upon connection it tells the peer device that is has a credit count of a first number. Every time the peer device sends a packet it decreases the credit count by 1. If the count reaches 0, no further packets are sent. When the AP 112 awakes, the remaining credit number is determined.

Every time the AP 112 hibernates, a particular message can be sent (e.g., a VSC) to manage the credits in the firmware 110. The controller handles the credit to allow a remote device 102b to send synchronization requests at any time or frequency. The AP 110 does not know in advance how often a remote device can request a synchronization signal. To avoid waking the AP 112 host at every request from the remote device 102b, the L2CAP reply is generated directly from AOP controller. In this mode (while the host is asleep), the firmware 110 controller manages the LE credit for each connection handle. The credit only applies to credit sent from the mobile device 102a to the remote device 102b. Any packet coming from remote device 102b can wake the AP 112.

In an example, when the AP 110 hibernates, a VSC_Set_L2CAP_Credit message is generated for each connection handle needed to manage the credit. When the AP 110 wakes up, the firmware controller 110 sends the VSE_Get_L2CAP_Credit. The host will update its credit for every connection handle and manage L2CAP credit. In some implementations, multiple (e.g., up to 8) different connection handles with 8 different credit values can be managed.

Continuing with FIG. 3, the LL module 120a receives the request signal 308. Because the BTLE timestamp data has been precomputed, the firmware 110 controller does not request the data from the AP 112 but generates the conversion signal 309 representing the BT clock for the mobile device 102a to provide to the remote device 102b. The synchronization request 312 is received by the firmware 110 controller and the converted timestamp response signal 314 is generated. The L2CAP synchronization message 316 is sent from the LL module 120a of the mobile device 102a to the LL module 120b of the remote device 120b. The remote device determines the timestamp status 318 for synchronization, and an acknowledgement signal 320 is returned if synchronization is successful.

In some implementations, rather than the firmware controller 110 maintaining the UWB clock and performing the conversion (UWB/BT), the firmware itself performs the clock conversion. The firmware 110 can have direct access to the UWB clock (e.g., through GPIO) and track the UWB clock directly (e.g., via request 330). In this example, the firmware 110 has its own clock.

Figure 4:
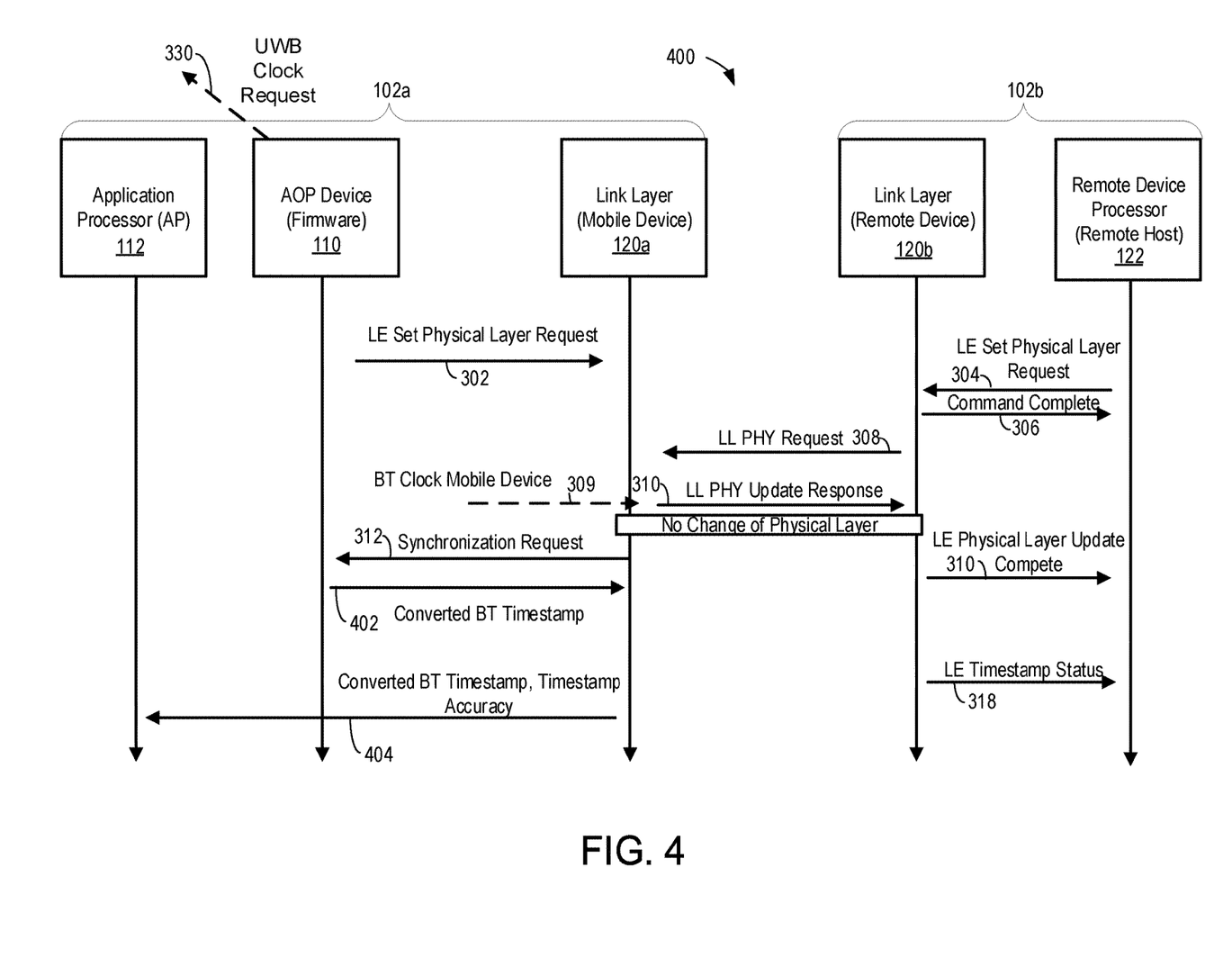

FIG. 4 shows an environment 300 for synchronization estimation between wireless communications devices in ultra-wideband (UWB) scenarios. In FIG. 4, the firmware sends the synchronization data back to the controller in message 312. The BT firmware 110 polls the controller 402 to get a converted BT clock value. The firmware then sends a message 404 to the AP 112 including the converted clock value and the clock accuracy. This can result in performing synchronization without the AP 112, even when the AP is awake.

Figure 5:
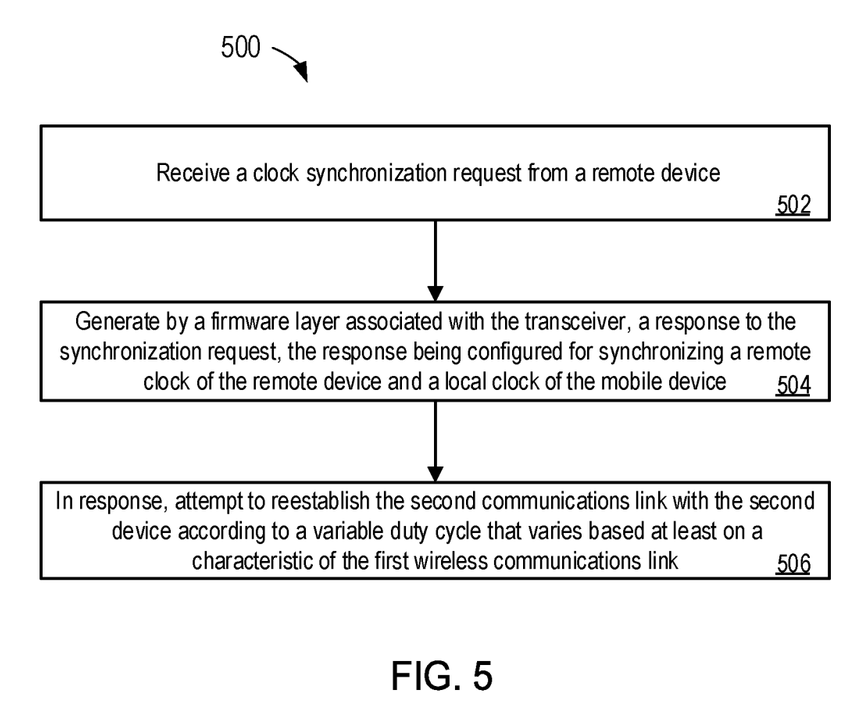
FIG. 5 is a flow diagram showing a process for synchronization estimation between wireless communications devices in ultra-wideband (UWB) scenarios.

FIG. 5 shows a process 500 for execution by a mobile device (e.g., a UE), previously described. The process 500 includes receiving (502), at a transceiver of a mobile device, a clock synchronization request from a remote device, the request being received over a wireless communication link.

The process 500 includes generating (504), by a firmware layer associated with the transceiver, a response to the synchronization request, the response being configured for synchronizing a remote clock of the remote device and a local clock of the mobile device. The process includes sending (506), to the remote device by the transceiver, the response to the synchronization request. In some implementations, the firmware layer is configured for generating the response without accessing an application processor (AP) of the mobile device. The mobile device is configured to maintain an application processor (AP) of the mobile device in a hibernation state while generating the response, wherein the AP of the mobile device consumes a reduced power in the hibernation state relative to an increased power consumed during an active state in which the AP is enabled to process data. Generally, the firmware layer comprises a Logical Link Control and Adaptation Protocol L2CAP layer. Generating the response to the synchronization request includes obtaining, from the request, a first clock value for the remote clock. Generating the response includes accessing a second clock value for the local clock corresponding to receiving the request from the remote device. Generating the response includes determining an adjustment for a first frequency of the remote clock, a second frequency value of the local clock, or both the first frequency and the second frequency. Generating the response includes generating the response comprising data representing the determined adjustment, the response enabling the remote device to synchronize the remote clock with the local clock.

Figure 6:
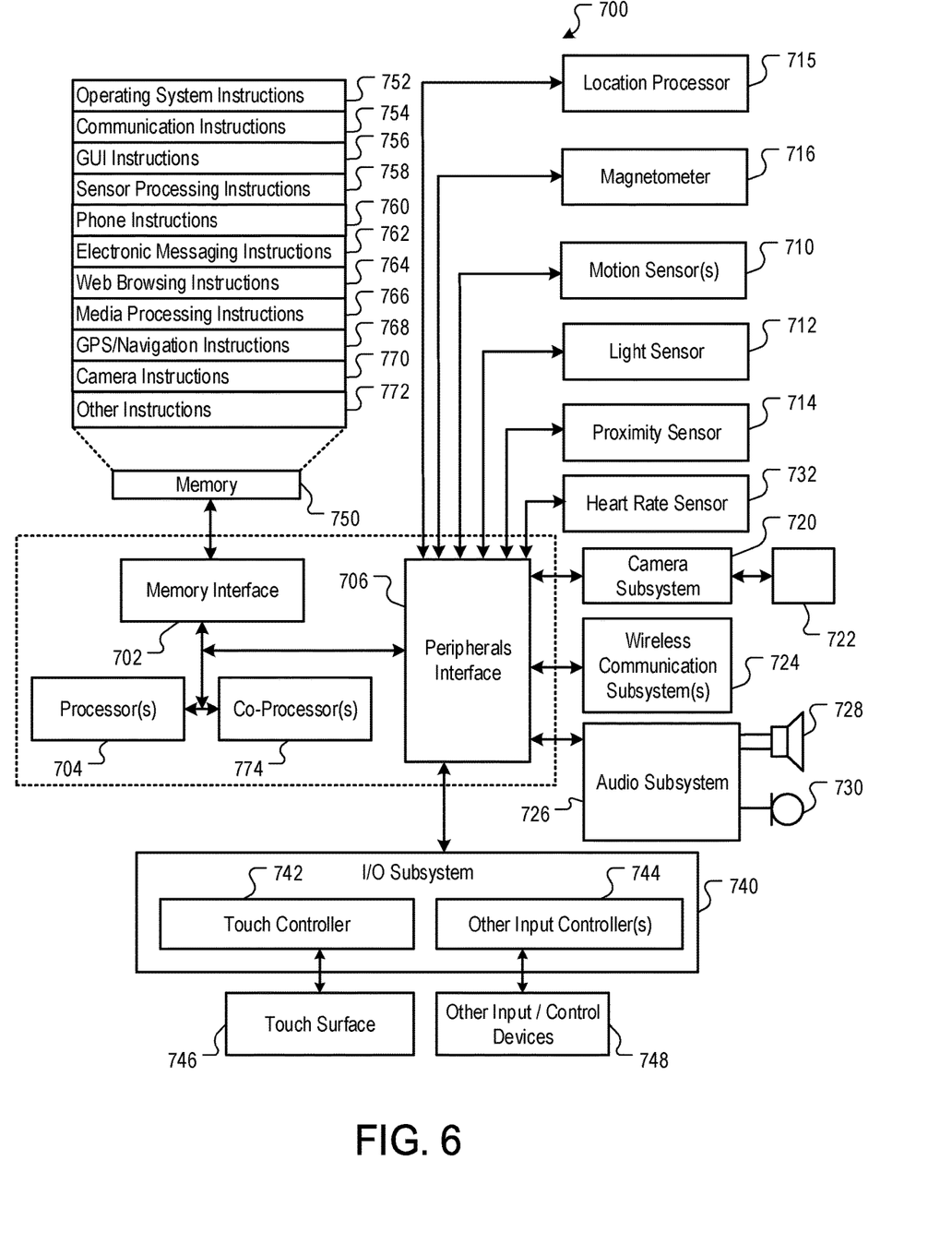
FIG. 6 is a block diagram of an example architecture for implementing the features and processes described in reference to FIGS. 1-5.

FIG. 6 is a block diagram of an example device architecture 700 for implementing the features and processes described in reference to FIGS. 1-6. For example, the architecture 700 can be used to implement the first electronic device 102a and/or the second electronic device 102b. Architecture 700 may be implemented in any device for generating the features described in reference to FIGS. 1-6, including but not limited to desktop computers, server computers, portable computers, smart phones, tablet computers, game consoles, wearable computers, set top boxes, media players, smart TVs, and the like.

The architecture 700 can include a memory interface 702, one or more data processor 704, one or more data co-processors 774, and a peripherals interface 706. The memory interface 702, the processor(s) 704, the co-processor(s) 774, and/or the peripherals interface 706 can be separate components or can be integrated in one or more integrated circuits. One or more communication buses or signal lines may couple the various components.

The processor(s) 704 and/or the co-processor(s) 774 can operate in conjunction to perform the operations described herein. For instance, the processor(s) 704 can include one or more central processing units (CPUs) that are configured to function as the primary computer processors for the architecture 700. As an example, the processor(s) 704 can be configured to perform generalized data processing tasks of the architecture 700. Further, at least some of the data processing tasks can be offloaded to the co-processor(s) 774. For example, specialized data processing tasks, such as processing motion data, processing image data, encrypting data, and/or performing certain types of arithmetic operations, can be offloaded to one or more specialized co-processor(s) 774 for handling those tasks. In some cases, the processor(s) 704 can be relatively more powerful than the co-processor(s) 774 and/or can consume more power than the co-processor(s) 774. This can be useful, for example, as it enables the processor(s) 704 to handle generalized tasks quickly, while also offloading certain other tasks to co-processor(s) 774 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 704 for further analysis.

Sensors, devices, and subsystems can be coupled to peripherals interface 706 to facilitate multiple functionalities. For example, a motion sensor 710, a light sensor 712, and a proximity sensor 714 can be coupled to the peripherals interface 706 to facilitate orientation, lighting, and proximity functions of the architecture 700. For example, in some implementations, a light sensor 712 can be utilized to facilitate adjusting the brightness of a touch surface 746. In some implementations, a motion sensor 710 can be utilized to detect movement and orientation of the device. For example, the motion sensor 710 can include one or more accelerometers (e.g., to measure the acceleration experienced by the motion sensor 710 and/or the architecture 700 over a period of time), and/or one or more compasses or gyros (e.g., to measure the orientation of the motion sensor 710 and/or the mobile device). In some cases, the measurement information obtained by the motion sensor 710 can be in the form of one or more time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 710 can be directly integrated into a co-processor 774 configured to processes measurements obtained by the motion sensor 710. For example, a co-processor 774 can include one more accelerometers, compasses, and/or gyroscopes, and can be configured to obtain sensor data from each of these sensors, process the sensor data, and transmit the processed data to the processor(s) 704 for further analysis.

Other sensors may also be connected to the peripherals interface 706, such as a temperature sensor, a biometric sensor, or other sensing device, to facilitate related functionalities. As an example, as shown in FIG. 7, the architecture 700 can include a heart rate sensor 732 that measures the beats of a user's heart. Similarly, these other sensors also can be directly integrated into one or more co-processor(s) 774 configured to process measurements obtained from those sensors.

A location processor 715 (e.g., a GNSS receiver chip) can be connected to the peripherals interface 706 to provide geo-referencing. An electronic magnetometer 716 (e.g., an integrated circuit chip) can also be connected to the peripherals interface 706 to provide data that may be used to determine the direction of magnetic North. Thus, the electronic magnetometer 716 can be used as an electronic compass.

A camera subsystem 720 and an optical sensor 722 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 724. The communication subsystem(s) 724 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 724 can depend on the communication network(s) or medium(s) over which the architecture 700 is intended to operate. For example, the architecture 700 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 700 can be configured as a base station for other wireless devices. As another example, the communication subsystems may allow the architecture 700 to synchronize with a host device using one or more protocols, such as, for example, the TCP/IP protocol, HTTP protocol, UDP protocol, and any other known protocol.

An audio subsystem 726 can be coupled to a speaker 728 and one or more microphones 730 to facilitate voice-enabled functions, such as voice recognition, voice replication, digital recording, and telephony functions.

An I/O subsystem 740 can include a touch controller 742 and/or other input controller(s) 744. The touch controller 742 can be coupled to a touch surface 746. The touch surface 746 and the touch controller 742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 746. In one implementation, the touch surface 746 can display virtual or soft buttons and a virtual keyboard, which can be used as an input/output device by the user.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In some implementations, the architecture 700 can present recorded audio and/or video files, such as MP3, AAC, and MPEG video files. In some implementations, the architecture 700 can include the functionality of an MP3 player and may include a pin connector for tethering to other devices. Other input/output and control devices may be used.

A memory interface 702 can be coupled to a memory 750. The memory 750 can include high-speed random access memory or non-volatile memory, such as one or more magnetic disk storage devices, one or more optical storage devices, or flash memory (e.g., NAND, NOR). The memory 750 can store an operating system 752, such as Darwin, RTXC, LINUX, UNIX, OS X, WINDOWS, or an embedded operating system such as VxWorks. The operating system 752 can include instructions for handling basic system services and for performing hardware dependent tasks. In some implementations, the operating system 752 can include a kernel (e.g., UNIX kernel).

The memory 750 can also store communication instructions 754 to facilitate communicating with one or more additional devices, one or more computers or servers, including peer-to-peer communications. The communication instructions 754 can also be used to select an operational mode or communication medium for use by the device, based on a geographic location (obtained by the GPS/Navigation instructions 768) of the device. The memory 750 can include graphical user interface instructions 756 to facilitate graphic user interface processing, including a touch model for interpreting touch inputs and gestures; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 769 to facilitate GPS and navigation-related processes; camera instructions 770 to facilitate camera-related processes and functions; and other instructions 772 for performing some or all of the processes described herein.

Each of the above identified instructions and applications can correspond to a set of instructions for performing one or more functions described herein. These instructions need not be implemented as separate software programs, procedures, or modules. The memory 750 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage.

Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving a clock synchronization request, the request being received over a wireless communication link from a remote device;
   generating, by at least one processor, response data to respond to the synchronization request, the response data being configured for synchronizing a remote clock of the remote device and a local clock of a device;

wherein generating the response data comprises, prior to receiving the request, precomputing the response data to respond to the synchronization request, the precomputed response data comprising L2CAP layer data; and preparing, for transmission to the remote device, the response data to the synchronization request.

2. The method of claim 1, wherein the at least one processor is configured for generating the response data without accessing an application processor (AP) of the device.

3. The method of claim 1, further comprising:
maintaining an application processor (AP) of the device in a hibernation state while generating the response, wherein the AP of the device consumes a reduced power in the hibernation state relative to an increased power consumed during an active state in which the AP is enabled to process data.

4. The method of claim 1, wherein a firmware layer associated with the at least one processor comprises a Logical Link Control and Adaptation Protocol L2CAP layer.

5. The method of claim 1, wherein generating the response data to respond to the synchronization request comprises:
obtaining, from the request, a first clock value for the remote clock;
accessing a second clock value for the local clock corresponding to receiving the request from the remote device;
determining an adjustment for a first frequency of the remote clock, a second frequency value of the local clock, or both the first frequency and the second frequency; and
generating data representing the determined adjustment, the response data configured to enable the remote device to synchronize the remote clock with the local clock.

6. The method of claim 1, wherein the response data comprises a converted Bluetooth (BT) clock value and a clock accuracy value, and wherein the synchronization request comprises a request for an ultra-wideband (UWB) clock value.

7. The method of claim 1, further comprising:
generating Bluetooth (BT) credit data, the BT credit data for use in controlling transmission to the remote device while an application processor (AP) is in hibernation;
sending the BT credit data to firmware layer associated with the at least one processor; and
causing the AP to initiate hibernation.

8. The method of claim 1, wherein the wireless communications link comprises a Bluetooth link.

9. The method of claim 8, wherein the Bluetooth link comprises a Bluetooth Low Energy Long Range (LE-LR) link or a Bluetooth Low Energy (LE) Coded Physical Layer (PHY) link.

10. The method of claim 8, wherein the wireless communications link comprises an ultra-wideband (UWB) link.

11. The method of claim 1, wherein the remote device comprises a vehicle.

12. An apparatus comprising processing circuitry configured to perform operations comprising:
receiving data representing a clock synchronization request from a remote device;
generating response data to respond to the synchronization request, the response data being configured for synchronizing a remote clock of the remote device and a local clock;

wherein generating the response data comprises, prior to receiving the request, precomputing the response data to respond to the synchronization request, the precomputed response data comprising L2CAP layer data; and preparing, for transmission, to the remote device, the response data to the synchronization request.

13. The apparatus of claim 12, wherein the processing circuitry is configured for generating the response data without accessing an application processor (AP).

14. The apparatus of claim 12, the operations further comprising:
maintaining an application processor (AP) in a hibernation state while generating the response, wherein the AP consumes a reduced power in the hibernation state relative to an increased power consumed during an active state in which the AP is enabled to process data.

15. The apparatus of claim 12, wherein a firmware layer associated with the processing circuitry comprises a Logical Link Control and Adaptation Protocol L2CAP layer.

16. The apparatus of claim 12, wherein generating the response data to respond to the synchronization request comprises:
obtaining, from the request, a first clock value for the remote clock;
accessing a second clock value for the local clock corresponding to receiving the request from the remote device;
determining an adjustment for a first frequency of the remote clock, a second frequency value of the local clock, or both the first frequency and the second frequency; and
generating response data representing the determined adjustment, the response data configured to enable the remote device to synchronize the remote clock with the local clock.

17. The apparatus of claim 12, wherein the response data comprises a converted Bluetooth (BT) clock value and a clock accuracy value, and wherein the synchronization request comprises a request for an ultra-wideband (UWB) clock value.

18. One or more non-transitory, computer-readable storage media having instructions stored thereon, that when executed by one or more processors, cause the one or more processors to perform operations comprising:
receiving data representing a clock synchronization request from a remote device;
generating response data to respond to the synchronization request, the response data being configured for synchronizing a remote clock of the remote device and a local clock; and
preparing, for transmission to the remote device, the response data to the synchronization request,
wherein the response data comprises a converted Bluetooth (BT) clock value and a clock accuracy value, and wherein the synchronization request comprises a request for an ultra-wideband (UWB) clock value.

19. The one or more non-transitory, computer-readable storage media of claim 18, wherein generating the response data comprises, prior to receiving the request, precomputing the response data to respond to the synchronization request, the precomputed response data comprising L2CAP layer data.

* * * * *